UNITED STATES PATENT OFFICE.

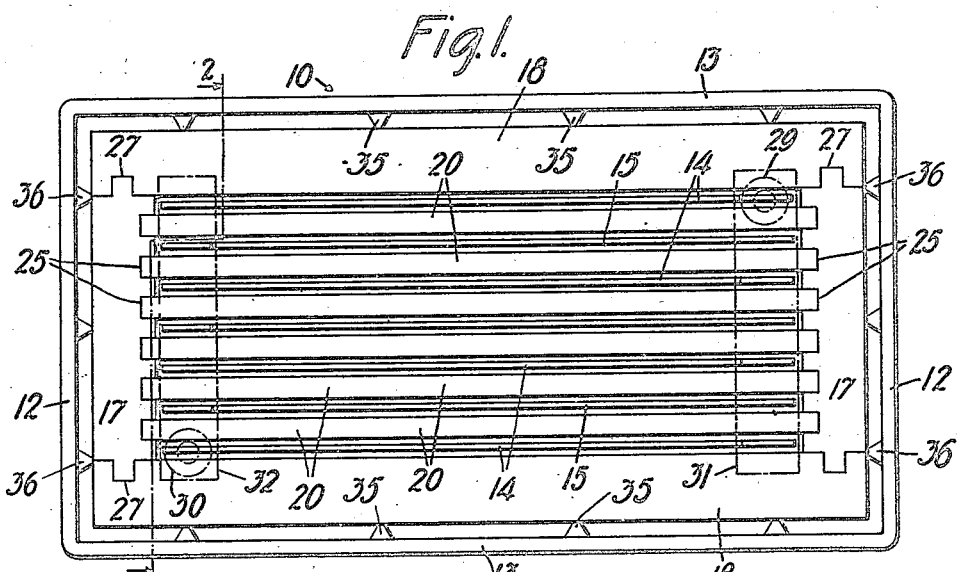
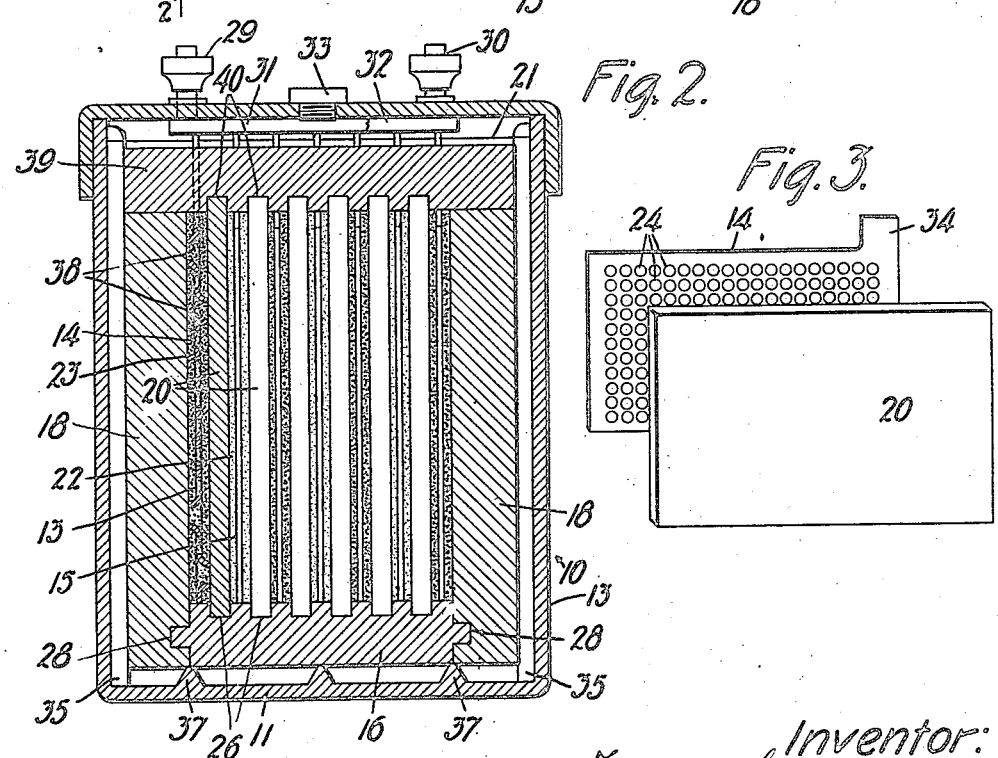

FREDERICK G. MANWARING, OF CAMPGAW, NEW JERSEY.

STORAGE BATTERY.

1,419,396.

Specification of Letters Patent. Patented June 13, 1922.

Application filed May 25, 1920. Serial No. 384,188.

*To all whom it may concern:*

Be it known that I, FREDERICK G. MANWARING, a citizen of the United States, residing in Campgaw, in the county of Bergen and State of New Jersey, have invented certain new and useful Improvements in Storage Batteries, of which the following is a specification.

This invention relates to storage batteries in which positive and negative plates carrying the active material are immersed in an electrolyte.

The plates or frames are usually perforated, and the perforations filled with the active material. The frames are usually formed of an alloy of lead, and in order to provide for the necessary strength they are given considerable body. Moreover, to avoid distortion, the lead is alloyed with antimony, which gives hardness. This is an objection. There is liability of loss of the active material or paste from the perforations or pockets in the frames, especially if the battery is repeatedly charged. The frames are likely to buckle, on account of local action. When one or more plates buckle they will touch each other and cause an internal short circuit. This buckling is largely due to lack of uniformity of action of the electrolyte upon the plates; the circulation of the electrolyte being apt to be slow and uneven, since there is commonly used a channeled wooden separator, which is placed next to the lead plate. Dependence is placed upon the circulation of the electrolyte through these channels to act upon the plate. After some use, distortions occur in the plates and also in the separators, the wood becomes soft and gets pressed up against the plate, and eventually rests almost flat against the surface of the plate or frame. Therefore the circulation of the electrolyte is restricted, and it becomes less rapid and efficient in all parts of the plate, the action being greatest on the bottom part, where the electrolyte has the best access to the plate. This disparity causes uneven expansion and curving of the plate, and hence buckling is one of the principal troubles, particularly when the battery is drawn on heavily, as when starting an automobile.

Again, lead sulphate is apt to be formed by the discharge of the battery, this material assuming a crystalline condition if the cell remains in a discharged condition too long. If an attempt is made to decompose the sulphate by heavily overcharging an ordinary battery, the gases generated would have a tendency to eject the paste from the frame.

Another objection to the ordinary storage battery is excessive weight. This is because it contains more lead than is really needed for the electro-chemical work. Since the lead plate in an ordinary battery is supported at only one point by a lug at the top thereof, the plate must be made quite rigid, and hence grids have been devised in a variety of shapes in attempting to overcome this difficulty.

The objects of the invention are to overcome these and other difficulties, and produce at small cost a storage battery of greater durability and better capable of withstanding hard usage.

To these and other ends, within the outer casing or tank there is introduced a structure which comprises a series of compartments, and in each compartment there is placed a plate. The compartment structure may be made of cellular artificial stone or filtering material, which serves as a reservoir for electrolyte. Each compartment is filled partly by its frame and partly by the active material or paste; and the electrolyte has free and rapid circulation through the cellular stone, and is given uniform access to all portions of the surface of the paste. The tendency to local action and buckling is thus reduced or overcome; and, moreover, even if there is a buckling tendency, the paste and plates would retain their positions and shapes, because of the rigidity of the cellular stone partitions or slabs. A solid structure is produced, preventing the liability of the paste becoming ejected or misplaced.

Since the active material and the frames are completely confined and supported in a substantial manner, it is practical to make the frames of far less weight than heretofore for the same capacity.

Other features and advantages will hereinafter appear.

In the accompanying drawings,

Figure 1 is a plan of a cell or battery embodying the present improvements in one form.

Figure 2 is a sectional elevation taken at about the line 2—2 of Figure 1.

Figure 3 is a perspective view of one of the lead frames and one of the cellular partitions.

The cell or battery may comprise a tank or container designated generally as 10, and having a bottom 11, end walls 12 and side walls 13. The positive plates or frames 15 alternate with the negative frames 14. To receive these frames, there is provided a chambered structure, one chamber for each frame; and this structure comprises a box which lines the tank, and partitions which divide the box into the chambers or compartments. The bottom of this lining box is designated as 16, its ends as 17, and its side walls as 18. Its partitions are indicated at 20, and serve to separate the frames from one another.

The tank is filled to the proper height with an electrolyte 21, such as sulphuric acid diluted with water. This electrolyte permeates the material of the chambered box, which is a cellular artificial stone. Other cellular rigid material may be used. A good stone for the purpose is the article which is sold under the name of "Filtros" for filtering purposes, and through which the electrolyte may circulate freely, since it is so openly cellular that air may be easily blown through it. These walls and partitions may therefore serve as reservoirs for electrolyte, so that the proportion of electrolyte may be relatively large as compared with ordinary batteries. Moreover, the electrolyte is maintained in close proximity to the points where it is required, being thus superior to the usual batteries.

A further office of the compartments is to confine and support the solid active materials; the walls of the compartments being sufficiently rigid and durable for this purpose, while by reason of their cellular structure they permit ready access of the electrolyte to all portions of the active materials. Each compartment is filled partly by a frame 14 or 15, and partly by active material, such as lead peroxide 22 in each positive compartment, and pure spongy lead 23 in each negative compartment. Each frame is relatively thin, and the active material fills the chamber upon each side thereof, and also fills perforations 24 formed in the frame. In assembling, the active material or paste may be placed in the compartment, and then the frame may be thrust down into the paste until the frame rests upon the floor of the cellular box and the paste fills to the top of the chamber. The paste cannot pass through the stone slabs which form the walls of the compartment. In other words, the paste is filtered out by the cellular slabs, in which the electrolyte freely circulates. The positive and negative frames and the separating slabs are built up next to one another, the frames being completely separated from one another by the slabs, making an entirely closed or solid structure, so that no paste can be ejected from its compartment. The provision of the cellular separators (one on each side of each frame) conduces to rapid and uniform circulation of the electrolyte. Tendency of the frames to buckle is checked or overcome by the uniform electrolytic action over the whole plate, which may be regarded as comprising both the frame and the layers of paste on its opposite sides and in its perforations. Since the action is uniform all over, there is little or no localized action, and hence little or no buckling tendency. The use of the cellular hard separators or filtering slabs to form compartments for the separate plates permits the paste to be packed in the compartments in loose form if desired. It is unnecessary to compress the paste in order to hold it in place. It is unnecessary to form a cement-like material in the perforations of the frames, because the paste is supported between the cellular stone separators.

The cell or battery is less delicate and will withstand harder treatment than an ordinary battery, because it is capable of heavy and rapid discharge without the liability of buckling of the plates, which is present in an ordinary battery. If lead sulphate forms because of remaining discharged, this condition can be remedied by a heavy overcharge, but the paste or active material cannot be thrown out or displaced by reason of the overcharge, because it is mechanically confined. A battery made according to the present improvements may be short-circuited across its terminals and run rapidly down to zero, and upon recharging, the battery will be found not to have suffered damage; whereas such treatment of an ordinary battery would be likely to inflict serious injury.

If it should be attempted to overcharge an ordinary battery heavily, to decompose inactive lead sulphate which may have been formed, it will be found that the gases generated in the interior of the paste will tend to eject the paste from the frame. This difficulty is overcome by the present improvements, because the active material is confined, as already explained, so that it cannot be ejected or displaced, and hence the battery may safely be given an overcharge sufficiently heavy to decompose the inactive sulphate and reform active material.

It will be seen that buckling of the perforated frames could not occur unless the separating slabs were first crushed; but these may be made too rigid and substantial to be liable to such injury, especially as soft thin lead is used in construction of the plates.

I make each frame 14, 15 of a sheet of very thin rolled lead (thus reducing weight) perforated to receive the paste; this frame may be of any desired form, and, because of the method of construction, it is relatively light, inasmuch as it need not be used for supporting purposes, but only for collecting current. The invention is not limited to lead frames which are soft, although soft lead has advantages, for example, it lacks strength or rigidly, and is not liable to cause injury through buckling. If there were any tendency to buckle, the lead would bend locally rather than distort in a manner to cause any damage. The frame, although preferably relatively soft, may be of such a nature as not to render it liable to local electrolytic action between the frame and the spongy lead, or between the frame and the lead peroxide. The usual alloy of lead and antimony may be used if desired. Pure lead may be used, if desired, without liability of rapid deterioration, since it is faced on both sides with the active material. The frame is well supported by the stone slabs, and by the stone floor upon which its lower edge rests, so that there is no need either to give the frame a heavy body, or to make it hard, for the purpose of affording support, as heretofore. Its principal function is to serve as a collector for the current. The frames may be relatively large and light, since they are not depended upon for support. They may be substantially lighter in weight than frames having the same capacity in an ordinary battery, since they need have no heavier body than is required for electro-chemical requirements. The frame does not need to have the strength of an ordinary frame, which has a supporting lug at the top. Since the active part of the battery is the paste, the metal in the plate need only be sufficient to collect the current; and the frame may be therefore a light rolled sheet-metal conductor or grid.

I am aware that it was proposed in the patent to W. G. Hatch, No. 441,413, of November 25, 1890, to employ with the lead plates intermediate plates of stiff, porous material, which the liquid was intended to permeate, and it being suggested that their stiffness would enable them to maintain their form when said intermediate plates and the lead plates were clamped together; and for said intermediate porous plates there was suggested, in said patent, the use of earthenware or other acid-resisting material. I employ filtering slabs, which are of open cellular structure or of a scoriaceous nature, through which air could be directly blown. This open cellular nature of the filter permits that free and rapid circulation of the electrolyte which is necessary in practice. Earthenware, which is suggested in said Hatch patent, is not a filter, nor is it cellular or scoriaceous, and if there should be any oozing of electrolyte into or out of its pores, the action would be so slow as to be prohibitive in practice, since earthenware would not afford even so free a circulation of electrolyte as is afforded by the ordinary ribbed wooden separators. Filtros, by reason of capillary attraction, absorbs water like a sponge, and the thick walls and top of the box therefore afford a large reservoir for electrolyte, which is also self-circulating through the separator plates from edge to edge of each, and hence is given ample and constant opportunity to affect the active material throughout the width and height of each compartment, these compartments being material-tight, in that the active material cannot pass from one compartment to another.

The ends of the separating slabs fit closely in vertical grooves 25 formed in the inner faces of the end stones 17; and the top surface of the floor stone 16 is formed with corresponding grooves 26 to receive the bottom edges of the separators. The latter are thus firmly and closely supported at their bottoms and ends, to prevent escape or displacement of the active material from the plates. The end stones 17 may be rabbeted to the side walls 18, as at 27; and the bottom stone 16 may be likewise fitted to the side walls, as at 28. The entire stone compartment work may be assembled and then introduced into the tank, which may closely confine the same. Terminals 29, 30, collector bars 31, 32, and vents or caps 33 may also be provided; the frames having ears 34 connected to the bars after the frames are set down into the paste.

In order to facilitate the insertion and withdrawal of the stone compartment work, and to gain other advantages, the same may be held separated from the sides, ends and floor of the tank by means of cleats or ribs 35, 36, 37. These cleats leave considerable space around the stonework for additional electrolyte, and favor free circulation. The side cleats 35 may be either horizontal or vertical.

The perforations 24 may be pressed in the frame, in a manner to form projecting burrs or flanges 38 on opposite sides of the frames, some of the flanges projecting on one side of the plate, and some on the other side. These flanges may project sufficiently to contact with the adjacent stone slabs, so that the frames may be directly supported by the slabs. The frames are thus positioned centrally of the compartments, and not subject to sidewise displacement, and are well supported against local deformations. The frames are set in place after the compartment work is slipped into the tank. The frames do not need to have perforations in all forms of the invention; but the perforations are of course filled up with the paste into which the frame is set. The positive frames may be perforated and the negative frames unperforated, in some cases; or vice versa.

A cap stone or slab 39 may cover the compartments, and may be formed of similar cellular filtering material, and may have in its under face transverse grooves 40 to receive the upper edges of the separators, thus conducing to their efficiency as supporters. The cap stone may further aid in confining the paste within the compartments.

Variations may be resorted to within the scope of the invention, and portions of the improvements may be used without others.

Having thus described my invenion, I claim:

1. The combination of an electrolyte tank, stone partitions or separators dividing it into compartments, said stone partitions having an open cellular structure for the rapid circulation of electrolyte therethrough, and frames inserted one in each compartment and provided with active material.

2. The combination of an electrolyte tank, stone partitions or separators dividing it into compartments, said stone partitions having an open cellular structure for the rapid circulation of electrolyte therethrough, and frames inserted one in each compartment and provided with active material, the partitions or separators supporting the frames and preventing the ejection or displacement of the active material.

3. The combination of an electrolyte tank, stone partitions or separators dividing it into compartments, said stone partitions having an open cellular structure for the rapid circulation of electrolyte therethrough, and frames inserted one in each compartment and provided with active material, the partitions or separators supporting the frames and preventing the ejection or displacement of the active material, each compartment being filled by its frame and the active material.

4. The combination of an electrolyte tank, stone partitions or separators dividing it into compartments, said stone partitions being porous for the circulation of electrolyte therethrough, and frames inserted one in each compartment and provided with active material, the frames being inserted in the active material, which is in the form of loose paste.

5. The combination of an electrolyte tank, stone partitions or separators dividing it into compartments, said stone partitions being porous for the circulation of electrolyte therethrough, and frames inserted one in each compartment and provided with active material, the partitions or separators supporting the frames and preventing the ejection or displacement of the active material, said partitions, said active material and said frames forming a solid structure.

6. The combination of an electrolyte tank, a box inserted in the tank, slabs or separators dividing the box into compartments, said box and separators having an open cellular construction for the rapid circulation of electrolyte therethrough, and frames in the compartments, each frame provided with active material.

7. The combination of an electrolyte tank, stone partitions or separators dividing it into compartments, said stone partitions being porous for the circulation of electrolyte therethrough, and frames inserted one in each compartment and provided with active material, each of said frames being a thin sheet of soft lead and resting upon its bottom edge and supported throughout by the porous separators.

8. The combination of an electrolyte tank, a box inserted in the tank, slabs or separators dividing the box into compartments, said box and separators being porous for the circulation of electrolyte therethrough, and frames in the compartments, each frame provided with active material, said box and separators being formed of filtros.

9. The combination of an electrolyte tank, a box inserted in the tank, stone slabs or separators dividing the box into compartments, said box and separators having an open cellular construction for the rapid circulation of electrolyte therethrough, and frames in the compartments, each frame provided with active material.

10. The combination of an electrolyte tank, a box inserted in the tank, slabs or separators dividing the box into compartments, and frames in the compartments, each frame provided with active material, the separators being of open cellular construction to permit free circulation of the electrolyte to all parts of the face of the active material, and to act as filters against said active material to prevent escape or displacement thereof, and said box being also cellular to permit circulation of electrolyte.

11. The combination of a tank or casing for electrolyte, a box lining the same, and slabs or separators dividing the box into compartments, said box and separators being porous for the circulation of electrolyte therethrough, each compartment containing active material into which is inserted a frame to fill the compartment.

12. The combination of a tank or casing for electrolyte, a box lining the same, and slabs or separators dividing the box into compartments, said box and separators being porous for the circulation of electrolyte therethrough, each compartment containing active material into which is inserted a frame to fill the compartment, each frame being made of thin rolled pure lead having perforations filled with paste.

13. The combination of a tank or casing for electrolyte, a box lining the same and slabs or separators dividing the box into compartments, said box and separators being porous for the circulation of electrolyte therethrough, each compartment containing active material into which is inserted a frame to fill the compartment, the frame being faced on both sides with the active material.

14. The combination of an electrolyte tank, a box inserted in the tank, slabs or separators dividing the box into compartments, said box and separators being porous for the circulation of electrolyte therethrough, and frames in the compartments, each frame provided with active material, grooves being formed in the sides of the box, and the separating slabs fitting in the grooves.

15. The combination of an electrolyte tank, a box inserted in the tank, slabs or separators dividing the box into compartments, said box and separators being porous for the circulation of electrolyte therethrough, and frames in the compartments, each frame provided with active material, the sides, ends and bottom of the box being rabbeted together.

16. The combination of a tank or casing for electrolyte, a box lining the same, slabs or separators dividing the box into compartments, said box and separators being porous for the circulation of electrolyte therethrough, each compartment containing active material into which is inserted a frame to fill the compartment, said frames having ears, and collector bars connected to said ears.

17. The combination of a tank or casing for electrolyte, a box lining the same, slabs dividing the box into compartments, each compartment containing active material into which is inserted a frame to fill the compartment, said frames having ears, collector bars connected to said ears, and a cap stone to cover the compartments and serving as a reservoir for additional electrolyte, said box, slabs and cap stone being porous for the circulation of electrolyte therethrough.

18. The combination of an electrolyte tank, stone partitions or separators dividing it into compartments, said stone partitions being porous for the circulation of electrolyte therethrough, and frames inserted one in each compartment and provided with active material, the partitions or separators supporting the frames and preventing the ejection or displacement of the active material, the perforations in said frames being formed with burrs or flanges projecting alternately on opposite sides of the frames.

19. In a storage-battery, the combination of a box or container, a series of fixed partitions in the box forming a series of material-tight compartments; an electrode in each compartment, alternate electrodes being positive and the remainder negative, and loose active material packed in each compartment about the electrode therein, said box and partitions formed of highly absorbent cellular or spongy stiff material forming a reservoir through which the electrolyte is self-circulating and has ready and constant access to the active material throughout the height and width of each compartment.

FREDERICK G. MANWARING.

Witnesses:
M. J. HARTUNG,
MATILDA ATKIND.